May 21, 1968 W. H. KING 3,384,851
GEAR-ADJUSTED POTENTIOMETER
Filed Sept. 16, 1966
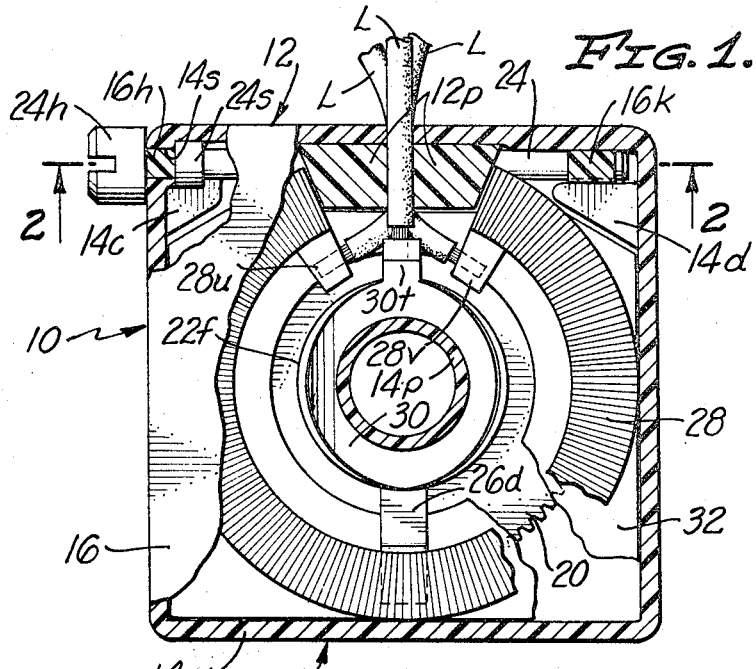
FIG. 1.
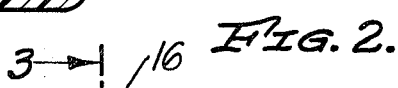
FIG. 2.
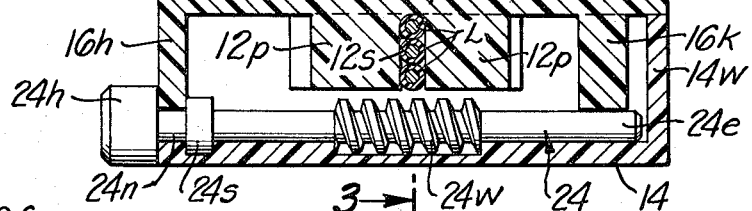
FIG. 3.
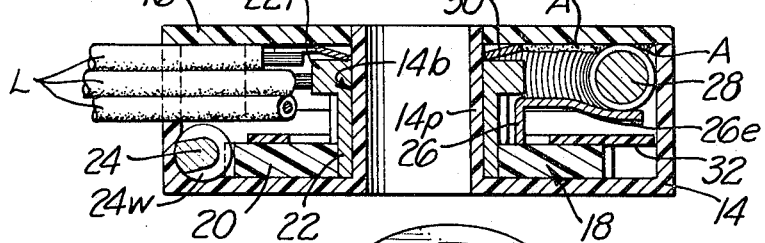
FIG. 4.
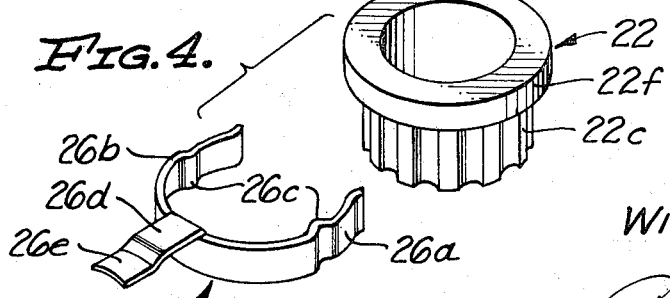
INVENTOR
WILLIAM H. KING
BY

United States Patent Office 3,384,851
Patented May 21, 1968

3,384,851
GEAR-ADJUSTED POTENTIOMETER
William H. King, Riverside, Calif., assignor to
Bourns, Inc., a corporation of California
Filed Sept. 16, 1966, Ser. No. 580,044
5 Claims. (Cl. 338—174)

ABSTRACT OF THE DISCLOSURE

A gear-adjusted potentiometer having an arcuate resistance element and a rotatable contact arranged to rotatively brush along the element between limits established by stops, gearing means for rotating the contact, the gear means comprising a gear wheel having teeth on its periphery and a generally cylindrical hub, the hub having longitudinal serrations and the contact having opposed curved arms embracing the generally cylindrical surface of the hub and the contact arms having respective corrugations engaging the serrations of the hub, and the potentiometer comprising housing means for supporting and housing the aforenamed components, whereby a yielding drive for rotating the contact is established to permit harmless continued rotation of the gear wheel following arrestment of the contact by the stops.

---

Gear-adjusted potentiometers are commonly of the type utilizing a worm wheel rotatable within the interior of a shell or housing and a worm engaged with the worm wheel and disposed for rotation in bearing means within or formed by the housing and having a shaft extension accessible from outside the housing for facilitating rotation of the gearing. Variously, the worm wheel is connected to the contact to drive the latter along an arcuate resistance element. In most modern potentiometers of the noted type, means in the form of stops are provided for preventing the contact from being driven beyond either end of the resistance element, and friction device or clutch means are interposed between the contact and the worm wheel to obviate any of the components being damaged if the worm is driven excessively.

Briefly, the present invention comprehends a very inexpensive integral structure providing both contact and clutch element, in combination with another, inexpensive, driving clutch element which receives driving effort from the worm wheel. Preferably the second clutch or driving element is made to be an integral part of a worm wheel device in those cases where worm gear driving is used, or to be an integral part of a spur or crown gear in those cases in which plain gearing is used. By specially forming the driving clutch element relative to the shape of the contact device, chances of contact disarrangement or failure in the potentiometer are substantially completely obviated. By providing bearing structures on or in which the rotatable components of the potentiometer rotates, as portions of the potentiometer housing, and by forming the contact device as a single small simply-formed member, the number and complexity of components and the cost of the potentiometer are greatly reduced, despite the use of precious metal or alloy as a material from which the contact device is formed. In general, a centrally located post formed as part of the potentiometer housing serves at once to greatly reinforce the housing of the potentiometer and provide the bearing surface upon which the contact-driving gear and clutch member are rotatale. The latter member is made electrically conductive and formed to cooperate with the latter gear to provide a spool-like structure presenting an annular groove in which opposed clasping arms of a contact device are adapted to fit, the arms frictionally engaging the central generally cylindrical but serrated portion of the spool-like structure. Thus the contact member is carried around and along a circular or arcuate path by the driving clutch member, and is electrically connected thereto, but may slip relative thereto if stopped by stop devices or surfaces. The contact device comprises a radially-extending contact limb integral with the arms and terminating in a contact adapted to brush on an arcuate resistance element disposed coaxially with the bearing post in the housing. A circular conductive spring serves concurrently as a brush to provide electrical connection to the driving clutch member and contact device from a terminal member and to maintain rotary components in proper operating positions. Other terminal members are provided for respective ends of the arcuate resistance element. The externally accessible shaft-like portion of the manually-operable driving gear or worm is formed to concurrently be held captive and to be rotatably supported in driving relationship with the driven gear, by cooperating portions of two opposed insulation housing members. The latter are formed to substantially completely house and protect the active components of the potentiometer. Electrical isolation of the externally-accessible portion of the shaft of the driving gear or worm is most simply, but not necessarily, effected by forming at least the toothed rim portion of the driven gear device of insulation.

The foregoing brief general description of the invention makes evident that a principal object of the invention is to provide a gear-adjusted miniature potentiometer of simple and inexpensive construction but of high reliability and immunity to damage incident to overdriving.

Other advantages and objects of the invention are hereinafter set out or made apparent in the appended claims and following detailed description of a preferred physical embodiment of the invention, the description having reference to the accompanying drawings forming part of this specification.

In the drawings:

FIGURE 1 is a plan view of an exemplary potentiometer according to the invention, with part of a housing broken away and components entirely or partially removed to better illustrate internal details, the drawing being on a grossly enlarged scale;

FIGURE 2 is a transverse sectional view of the noted exemplary potentiometer, the section being in the direction and on a plane indicated by section line 2—2 of FIGURE 1;

FIGURE 3 is a transverse sectional view of the noted exemplary potentiometer, the section being taken in a direction and on a plane indicated by section line 3—3 in FIGURE 2; and FIGURE 4 is a pictorial view of a contact device and coacting rotary device which are components of the exemplary potentiometer, shown removed from the instrument and separated.

The exemplary potentiometer, 10, comprises a housing 12 preferably formed of insulation such as a thermosetting synthetic resin, the housing comprising a first part which for convenience is herein termed a lower part or base, 14, and a second part which similarly is termed an upper part or cap, 16. The base and cap are formed with interfitting or complementary surfaces and during final stages of assembly are adhesively united to form a strong box-like housing providing a generally annular chamber in which operating parts are housed. Base 14 has upstanding at the center thereof a cylindrical post 14p the interior of which provides a hole or bore through the center of the potentiometer, through which hole a mounting screw may extend for securing the potentiometer to other structure.

The post 14p provides a cylindrical bearing surface 14b (FIGURE 3) on which a driven gear device 18 is mounted for rotation. The driven gear device comprises a worm wheel 20 and a hollow shaped hub 22 whose cylindrical inner bore surface bears on surface 14b. The lower face of the driven gear device bears upon the lower interior face of base 14 as indicated in FIGURE 3. Hub 22 is provided with a flange 22f at its upper end, and is longitudinally serrated or fluted along the remainder of the exterior generally cylindrical surface 22c. The lower end portion of the hub is affixed in a complementary axial aperture or bore provided in the wheel 20, as by press-fitting or with adhesive or the like, whereby the hub is required to rotate with the wheel as an integral part of the gear device. The serrated middle portion of the hub forms a driving clutch member.

Base 14 is further formed with projections 14c, 14d (FIGURE 1) upstanding from the interior floor, and a deep narrow slot 14s in one of the four upstanding walls 14w, whereby to provide bearing slots for reception and support of a driving worm and shaft 24. As shown in FIGURE 2, the driving worm and shaft, hereinafter termed driving gear for brevity and convenience, comprises a portion 24n adapted to be received in slots 14s of the housing base, a head 24h the inner surface of which engages the outer wall of base 14, and a shoulder 24s arranged to engage the interior wall of the base. The driving gear 24 further includes a toothed portion 24w, and an inner end 24e adapted to rest in the slot between projection 14d and the opposing thickened wall of the base as indicated in FIGURE 1. Thus as indicated in FIGURE 2, the driving gear is disposed for rotation in bearing seats or saddles formed at the lower ends of the noted slots. The worm or toothed portion is disposed for rotational driving engagement with the teeth of gear wheel 20 as indicated in FIGURE 3.

Removably carried on the serrated central driving clutch portion of hub 22 is a contact device 26 (FIGURES 3 and 4) which comprises a pair of curved resilient arms 26a, 26b, provided with opposed corrugations 26c, disposed and dimensioned to clasp the hub and engage in complementary grooves of the serrations. The arms of device 26 are shaped to close, when free, to a diameter less than that of the clasped serrated portion of hub 22, whereby the contact device is removably carried on the hub. The contact device further includes a resilient contact arm 26d whose free end is shaped to form a brushing contact 26e which is disposed for rotation along an arcuate section of a circular path and in brushing contact with an arcuate resistance element 28, as indicated in FIGURE 3.

The resistance element 28 (FIGURE 1) is of arcuate configuration, and in the exemplary form shown comprises a conventional curved insulated wire core or mandrel and helical wrapping of spaced turns of resistance wire. The element 28 is secured to the inner face of cap 12, with its ends abutted against a downwardly-extending laterally-slotted stop or post 12p (FIGURES 1 and 2) formed as an integral portion of the cap. Any suitable mode of attaching the element to the cap may be employed, e.g., adhesive such as indicated at A in FIGURE 3. The element ends are connected, as by brazing or soldering, to respective terminal members 28u, 28v; and to the latter devices are welded ends of respective ones of a set of three wire leads L which extend as a group from the housing via deep narrow aligned slots formed in the wall 14w of base 14 and post 12p of cap 16, as indicated in FIGURES 1, 2 and 3. The electrical ends of the resistance element are thus made electrically accessible exteriorly of the housing.

External electrical communication with the contact device 26 is by way of conductive hub 22, an annular conductive spring member 30 (FIGURES 1 and 3), and a respective one of wire leads L which is welded to spring member 30. Spring member 30 loosely encircles post 14p of the base 14, is waved or deformed to brush compressively on the upper end of hub 22 and is held so pressed by contact with the inner surface of cap 16 as indicated in FIGURE 3. Member 30 has a tab 30t (FIGURE 1) to which the wire lead L is welded. The three wire leads L are preferably tightly engaged in the slot in post 12p through which they extend and are preferably therein secured by sealant adhesive.

As is indicated in FIGURE 2, the housing cover or cap 16 is provided with downwardly depending posts 16h and 16k which are arranged and dimensioned to restrain the shaft portion of driving gear 24 from moving up out of its bearing seats, whereby injurious displacement of the driving gear is avoided. Thus rotation of head 24h causes rotation of contact 26e. When the cap 16 with the resistance element and leads L secured thereto is brought into place to place leads L in the wall slot and position and compress spring 30 and bring the resistance element down into engagement with contact 26e, adhesive is employed to secure the cap 16 to the base 14 and seal the housing against ingress of foreign material. Preferably, but not necessarily, a shaped sheet of stiff insulation, 32 (FIGURES 1 and 3), is interposed between the upper surface of gear wheel 20 and contact 26e, whereby contact 26e is prevented from injurious or undesired engagement with wheel 20.

As is evident, travel of contact 26e along the resistance element is limited in either direction by a respective face of post 12p, the latter being effective to arrest movement of the contact before the contact can be driven off the resistance element. When the contact is thus arrested, continued rotation of the driving and driven gears in the same direction causes spreading of the clasping arms or limbs of the contact device 26 by the corrugations or serrations of hub 22, followed by inward movement of corrugations 26c of the contact device into grooves of corrugations on the hub, and so on. Thus, in either direction of rotation, damage to the contact device is avoided, while assurance is had that positive rotation of the contact between the ends of the resistance element occurs due to the interengagement between the hub serrations and the clasping arms of the contact device.

As is also evident, the entire potentiometer structure is simple, inexpensive, and very easy to assemble. Thus the aforementioned objects of the invention have been attained.

I claim:

1. A gear-adjusted potentiometer comprising:

first means, including first and second interfitting housing members providing a housing and an enclosed chamber, and including a centrally-disposed post and and internal stop structure;

second means, including a driven gear device arranged for rotation on said post, and a driving gear device engaging said driven gear device and accessible from the exterior of said housing, said driven gear device including a longitudinally-serrated generally cylindrical hub rotatable about said post and having a conductive surface; and a gearwheel of diameter greater than said hub and extending radially outwardly from said hub;

third means, comprising an arcuate resistance element mounted on said housing in said chamber, and terminal means therefor, fourth means, including a resilient conductive contact device comprising first and second opposed curved arms clasping the longitudinally serrated generally cylindrical surface of said hub for rotation thereby and conductive engagement therewith, said opposed curved arms conforming generally to the generally cylindrical surface of said hub and having respective corrugations yieldingly engaging in serrations of said hub and said contact device further comprising a contact limb having a contact resiliently brushing on said resistance element along a circular path interrupted by said stop structure;

and fifth means, including a resilient spring member conductively brushing the conductive surface of said generally cylindrical hub, and a terminal connection for said spring member;

whereby incident to continued rotation of said driving gear said contact is driven along said circular path to vary the electrical resistance exhibited between terminals of said potentiometer until stopped by engagement with said stop device and thereafter yielding of said curved arms on said generally cylindrical hub obviates damage to said contact device.

2. A potentiometer according to claim 1, in which said centrally-disposed post is a hollow cylindrical structure joining opposed walls of said housing and presenting an aperture through said housing and serving to reinforce said housing and provide a cylindrical bearing surface for said driven gear device.

3. A potentiometer according to claim 1, in which said driven gear device includes a flat insulative driven gear wheel and a conductive hub insert affixed thereto and said hub having a flange and a longitudinally serrated generally cylindrical surface between a face of said gear wheel and said flange, and in which said spring member encircles said post and resiliently brushes on said flange.

4. A potentiometer according to claim 1, in which said first housing member is a square box-like structure having four upstanding side walls, a centrally-disposed upstanding hollow cylindrical post and a web interconnecting said post and said side walls, said first housing member having slots providing open bearing means for said driving gear, and said second housing member having outstanding post means for retaining said driving gear in said bearing means and having a centrally-disposed aperture fitting said cylindrical post.

5. A potentiometer according to claim 4, in which said driven gear device and said driving gear device are supported on said first housing member and in said resistance element is supported on said second housing member.

References Cited

UNITED STATES PATENTS

| 3,054,077 | 9/1962 | Mellor | 338—180 X |
| 3,105,217 | 9/1963 | Ferrell et al. | 338—174 |
| 3,242,451 | 3/1966 | Mathison | 338—174 |

FOREIGN PATENTS

| 914,278 | 1/1963 | Great Britain. |

ROBERT K. SCHAEFER, *Primary Examiner.*

H. HOHAUSER, *Assistant Examiner.*

UNITED STATES PATENT OFFICE
CERTIFICATE OF CORRECTION

Patent No. 3,384,851                                May 21, 1968

William H. King

It is certified that error appears in the above identified
patent and that said Letters Patent are hereby corrected as
shown below:

Column 1, line 57, "rotates" should read -- rotate --;
line 68, "rotatale" should read -- rotatable --. Column 6,
line 12, after "in" insert -- which --.

Signed and sealed this 14th day of October 1969.

(SEAL)
Attest:

Edward M. Fletcher, Jr.                WILLIAM E. SCHUYLER, JR.
Attesting Officer                          Commissioner of Patents